United States Patent
Demol et al.

(10) Patent No.: US 8,168,925 B2
(45) Date of Patent: May 1, 2012

(54) GLASS-CERAMIC PLATE AND METHOD FOR THE PRODUCTION THEREOF

(75) Inventors: Franck Demol, Chateau-Thierry (FR); Pablo Vilato, Paris (FR)

(73) Assignee: Eurokera S.N.C., Chateau-Thierry (FR)

( * ) Notice: Subject to any disclaimer, the term of this patent is extended or adjusted under 35 U.S.C. 154(b) by 875 days.

(21) Appl. No.: 11/914,562

(22) PCT Filed: May 16, 2006

(86) PCT No.: PCT/FR2006/050448
§ 371 (c)(1),
(2), (4) Date: Nov. 16, 2007

(87) PCT Pub. No.: WO2007/000532
PCT Pub. Date: Jan. 4, 2007

(65) Prior Publication Data
US 2008/0190409 A1    Aug. 14, 2008

(30) Foreign Application Priority Data
May 20, 2005    (FR) ...................................... 05 51315

(51) Int. Cl.
*H05B 3/68* (2006.01)
(52) U.S. Cl. ................................ 219/452.12; 219/460.1
(58) Field of Classification Search .... 219/443.1–468.2; 428/426, 428, 429, 210; 126/39 H, 39 N, 126/39 J
See application file for complete search history.

(56) References Cited

U.S. PATENT DOCUMENTS

| | | | |
|---|---|---|---|
| 3,816,704 A | 6/1974 | Borom et al. | |
| 4,057,434 A | 11/1977 | Rittler | |
| 4,913,784 A * | 4/1990 | Bogenschutz et al. | ........ 205/184 |
| 5,104,692 A | 4/1992 | Belmares | |
| 5,716,712 A * | 2/1998 | Schonig et al. | ............... 428/428 |
| 5,891,520 A | 4/1999 | Makar et al. | |
| 7,009,150 B2 * | 3/2006 | Wennemann et al. | ... 219/452.11 |
| 2003/0019864 A1 * | 1/2003 | Krause et al. | ............. 219/460.1 |

FOREIGN PATENT DOCUMENTS

| | | |
|---|---|---|
| DE | 34 33 880 | 3/1986 |
| DE | 40 20 972 | 6/1991 |
| DE | 100 14 373 | 10/2001 |
| EP | 0 693 464 | 1/1996 |
| FR | 2 765 570 | 1/1999 |
| GB | 1 331 357 | 9/1973 |
| JP | 10-203848 | 8/1998 |

OTHER PUBLICATIONS

U.S. Appl. No. 12/445,585, filed Apr. 15, 2009, Vilato, et al.
U.S. Appl. No. 12/092,710, filed May 6, 2008, Vilato, et al.

* cited by examiner

*Primary Examiner* — Sang Y Paik
(74) *Attorney, Agent, or Firm* — Oblon, Spivak, McClelland, Maier & Neustadt, L.L.P.

(57) ABSTRACT

Glass-ceramic plates that may be used to cover or receive at least one heating element of a cooking apparatus include a coating comprising at least two contrasted zones. Methods and devices for producing such glass plates and cooking apparatus are provided.

15 Claims, 1 Drawing Sheet

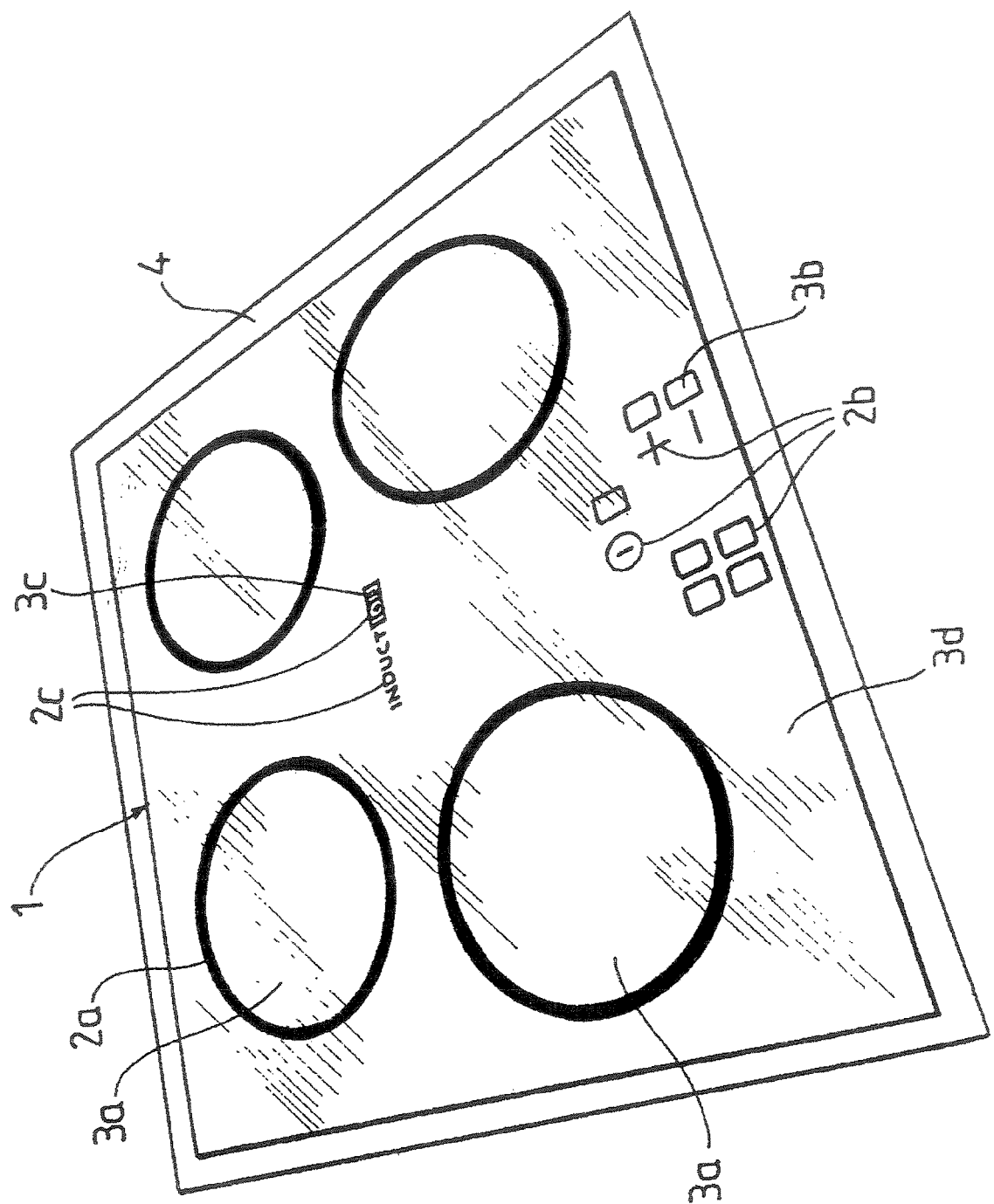

GLASS-CERAMIC PLATE AND METHOD FOR THE PRODUCTION THEREOF

BACKGROUND

The present invention relates to a glass-ceramic plate intended in particular to cover or receive heating elements, in particular intended to serve as a cooking plate, the heating elements associated with this plate being in particular of induction heating hobs.

Sales of glass-ceramic cooking plates have been constantly increasing for several years. This success is explained in particular by the attractive appearance of these plates and by their ease of cleaning.

It should be recalled that a glass-ceramic originates from a glass, called a precursor glass, of which the specific chemical composition makes it possible to bring about controlled crystallisation by suitable heat treatments called ceramization. This specific partly crystallized structure gives the glass-ceramic unique properties.

Various types of glass-ceramic plates currently exist, each variant being the result of sizeable studies and many tests, given that it is very difficult to make modifications to these plates and/or to the method for obtaining them without risking an unfavorable effect on the desired properties: in order to be usable as a cooking plate, a glass-ceramic plate must in particular have a transmission in wavelengths of the visible region that is at the same time sufficiently low in order to mask at least partly the subjacent heating elements at rest and sufficiently high, so that, with the aim of safety, the user can visually detect the heating elements in the operating state. Generally, it must also have a high transmission at wavelengths in the infrared region.

The first plates developed have therefore been plates with a dark color, in particular black. More recently, other plates have been developed with a lighter appearance (in particular white) and having for example a blur or haze of at least 50% (as described in patent FR2766816), the previously mentioned criteria (such as the detection of heating elements in the operating state without dazzle from said elements or without an unattractive appearance of these) sometimes being taken into account to the detriment of other aspects (such as the clear appearance of any display positioned under the plate).

SUMMARY

The present invention has sought to develop a novel type of glass-ceramic plate making it possible to widen the range of existing products, in particular an improved glass-ceramic plate having a more functional novel appearance, without the modifications provided having harmful effects on the normally desired properties.

The novel plate according to the invention is a glass-ceramic plate, intended for example to cover or receive at least one heating element, in particular intended to serve as a cooking plate, said plate having a coating comprising at least two contrasted zones.

Advantageously, the plate is based on a transparent or translucent glass-ceramic and the coating is intended to mask, at least partly, the subjacent elements at rest (such as the heating elements and any displays), while enabling the heating elements and any displays to be detected when they are in service. The aforementioned zones (or regions) are chosen so as to meet the objectives mentioned, and in particular exhibit a contrast (or opposition highlighted by their juxtaposition) with this aim that can be expressed in different ways (juxtaposition of matt/gloss effects, differences in thickness etc.) as explained hereinafter.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawing, wherein:

The FIGURE shows a schematic perspective view of an exemplary glass-ceramic plate according to the present invention.

DETAILED DESCRIPTION OF EXEMPLARY EMBODIMENTS

In general, one of the aforementioned zones (or group of zones as stated hereinafter) constitutes the zone, referred to as a background zone, occupying the majority of the surface area of the coating (generally 50 to 99%) and preferentially intended to mask the main part of the heating structure that the plate must cover, and the other aforementioned zone (or the other group of zones contrasted in relation to the background zone) is preferentially a zone referred to as a display zone, for revealing, in relation to the background, a decoration and/or information (trademark, logo, symbol etc.) and/or the location of functional elements such as heating elements, control devices, displays etc., this zone also making it possible to detect whether or not these elements are in an operational state (the surface area covered by the latter zone generally representing 1 to 50% of the surface area of the coating). From now on, a zone (according to the number of zones of each category present on the plate) will be understood to mean a single well-defined zone (when this zone is unique in its category) as well as a group or assembly of zones identically coated or having the same effect (in relation to the desired contrast between the zones or groups of zones) when there are several defined zones of the same category.

The glass-ceramic base or bare substrate forming the plate (before the addition of the coating) is preferentially transparent or translucent as previously indicated, and generally has a light transmission $T_L$ (in the visible wavelength region—integrated between 0.38 μm and 0.78 μm—according to the illuminant $D_{65}$) greater than 50%, in particular between 50 and 90%. The coating (and the layers constituting it as subsequently explained) is preferentially chosen so that the plate provided with the coating according to the invention has, at the location of its background zone, a very low light transmission, (in particular less than 5 or 10%, or even nearly zero or zero), the display zone being able as for it to have a light transmission for example less than 20% (in particular between 0.2 and 20%), in particular below 10% (in particular between 0.5 and 10%).

Advantageously, the coating with contrasted zones is principally (and preferably exclusively) situated on only one and the same face of the plate, advantageously the face intended to be turned towards (or positioned facing) the heating element or elements in the position of use (face generally referred to as the lower or inner face).

Preferably, according to the invention, the two contrasted zones are at least one zone with a shiny or reflecting or mirror effect, hereinafter called a reflecting zone, and at least one zone with (in particular comparatively) a matt effect (having in particular an at least partial opacifying or masking effect) hereinafter called the matt zone. In another also advantageous embodiment, the two contrasted zones are zones with coatings with variable thicknesses, the thickest zone substituting itself for example for the aforementioned matt zone and the thinnest zone substituting itself for the aforementioned reflecting zone.

Preferably, the matt zone (or thicker zone) is the zone called the background zone and the reflecting zone (or the thinner zone) preferentially constitutes the zone called the display zone.

The plate according to the invention has many advantages, technical as well as aesthetic, as will also appear in the remainder of the description. In particular, it makes it possible to mask the heating elements, control devices and associated displays when they are not in service, and enables them to be detected visually by the user when they are in service without the user being dazzled. If need be, the reflecting zone permitting at the same time this masking at rest and the detection of the elements in service, also has the advantage of making it possible to use indicators (of duration, power, etc.) such as light-emitting diodes, of various colors, contrary to the usual opaque or dark colored plates that only permit the use of indicators emitting in the red region.

The plates according to the invention are practical in use and easy to clean. The positioning of all the coating on the lower face makes it possible to prevent, if need by, unattractive optical effects such as a split image, at the same time as it makes it possible to prevent problems of the abrasion of said coating when the exposed face (outer or upper surface turned towards the user) of the plate in the use position is cleaned. The constituents of the plate are also chosen so that it has good mechanical strength and heat resistance and is compatible with the use of subjacent heating elements such as induction electric heating elements, or possibly other types of elements such as atmospheric gas burners.

A glass-ceramic plate is hereinafter understood to mean not only plates made of glass-ceramic proper but also plates in any other similar material resistant to a high temperature and having a coefficient of expansion that is zero or nearly zero (for example less than $15 \times 10^{-7} K^{-1}$). Preferably however it consists of a plate made of glass-ceramic proper.

The coating is preferentially formed of at least two layers positioned so as to form the aforementioned zones, one of the layers being preferentially a layer referred to as the paint layer (generally based on a resin or resins), resistant to high temperatures, said layer generally covering only the background zone, the other layer being preferentially a reflecting layer or a thinner layer of paint than the preceding one and generally covering at least the display zone.

The layer or layers of paint used are advantageously chosen so as to resist high temperatures and to have stability in time as regards their color and cohesion with the plate and so that they do not affect the mechanical properties of the plate.

The paint or paints used advantageously have a degradation temperature greater than 350° C., in particular between 350° C. and 500° C. They are generally based on a resin or resins, where appropriate filled (for example with pigment(s) or dye(s) and are, according to requirements, diluted in order to adjust their viscosity with a view to their application onto the glass-ceramic, the diluent or solvent (for example white spirit, toluene, etc.) being as the case may be eliminated during subsequent baking of the paint or paints.

For example, the paint may be a paint based on at least one silicone resin, in particular a silicone resin modified by the incorporation of at least one alkyd resin. Pigments may also be added as colorants, such as pigments for enamels (chosen for example from compounds containing metal oxides, such as chromium oxides, copper oxides, iron oxides, cobalt oxides, nickel oxides, or from copper chromates, cobalt chromates, etc.), $TiO_2$ etc.

In a particularly preferred manner, the paint used includes (or is based on) at least one high temperature resistant (co) polymer (in particular having a degradation temperature greater than 400° C.), it being possible for this paint to include or not to include at least one mineral filler so as to ensure its cohesion or its mechanical reinforcement and/or its coloration. This (co)polymer or resin may in particular be one or more of the following resins—polyimide resin, polyamide resin, polyfluorinated resin and/or polysiloxane resin.

Polysiloxane resins are particularly preferred: they are colorless and therefore capable of being colored, (for example with fillers or pigments giving them the desired color); they may be used in the crosslinkable state (generally by the presence of SiOH and/or SiOMe groups in their formula, these groups participating more often in an amount of 1 to 6% by mass of their total mass) or they may be converted (crosslinked or pyrolyzed). They advantageously have, in their formula, phenyl, ethyl, propyl and/or vinyl units, very advantageously phenyl and/or methyl units. They are preferably chosen from polydimethylsiloxanes, polydiphenylsiloxanes, phenylmethylsiloxane polymers and dimethylsiloxane/diphenylsiloxane copolymers.

The crosslinkable polysiloxane resins preferentially used generally have a weight-average molecular weight ($M_w$) of between 2000 and 300,000 daltons.

In a nonlimiting manner, it may be indicated that Dow Corning® resins 804, 805, 806, 808, 840, 249, 409 HS, and 418 HS, Rhodorsil® 6405 and 6406 from Rhodia, Triplus® from General Electric Silicone and SILRES® 604 from Wacker Chemie GmbH, used alone or mixed are perfectly suitable.

The resins chosen in this way are in particular able to withstand induction heating and may also be suitable (in particular the above polysiloxane resins) for other types of heating (gas burner or even radiant or halogen heating).

The paint may be free from mineral fillers, in particular if its thickness remains low. However, such mineral fillers are generally used for example to reinforce mechanically the deposited paint layer, to contribute to the cohesion of said layer, to contribute to its attachment to the plate, and to counteract the appearance and propagation of cracks within it etc. For such purposes, at least a fraction of said mineral fillers preferentially have a lamellar structure. The fillers may also take part in coloration. Where appropriate, several types of complementary fillers may participate (for example colorless fillers for mechanical reinforcement and other fillers such as pigments for coloration). The effective quantity of mineral fillers generally corresponds to a volume rate of 10 to 60%, more particularly 15 to 30% (volume rates based on the total volume of fillers and paint).

The thickness of each paint layer deposited may lie between 1 and 100 microns, in particular between 5 and 50 microns. Application of the paint or resin may be carried out by any suitable technique, such as deposition by brush, blade, spraying, electrostatic deposition, dipping, curtain coating, deposition by screen-printing etc., and is preferably carried out by screen-printing (or possibly deposition with a blade).

Deposition may also be followed by a heat treatment intended to ensure, according to the case, drying, crosslinking, pyrolysis etc. of the layer or layers deposited.

Preferably, the coating according to the invention comprises at least one layer of paint in which the resin has been, at least partly, crosslinked and/or pyrolyzed, partially or completely, and/or has not been heat treated (the resin may optionally be intended to be eliminated in places where it has not been heat treated) said paint layer consisting, partly or completely, of a mixture a) of mineral fillers and b) of at least one crosslinkable polysiloxane resin (nearly) free from carbonaceous material(s) precursor(s) and/or of at least one crosslinked polysiloxane resin (nearly) free from carbonaceous material(s) and carbonaceous material(s) precursor(s) and/or of a porous inorganic matrix based on silica (the resin having been for example pyrolyzed and therefore mineralized), (nearly) free from carbonaceous material(s), the mineral fillers being distributed in the resin or matrix.

As regards the reflecting layer or layers used as the case may be, according to the present invention, these layers may for example be layers with a mirror or shiny effect, based on thin layers or stacks of thin layers or including effect pigments, etc.

According to a first particularly advantageous embodiment, at least one reflecting layer is used formed of at least one (sub)layer of the metallic type and/or at least one (sub)layer based on a dielectric-based material, this reflecting layer generally and advantageously having a mirror effect.

This layer may therefore for example be at least one single metallic or substantially metallic layer (for example a thin layer of Ag, W, Ta, Mo, Ti, Al, Cr, Ni, Zn, Fe or an alloy based on several of these metals, or a thin layer based on stainless steels etc.) or may be a stack of (sub)layers comprising one or more metallic layers, for example a metallic (or substantially metallic) layer advantageously protected (coated on at least one face and preferably on its two opposite faces) by at least one layer based on a dielectric material (for example at least one layer made of silver or aluminum coated with at least one protective layer made of $Si_3N_4$—in particular an $Si_3N_4$/metal/$Si_3N_4$—stack—or made of $SiO_2$).

It may alternatively consist of a monolayer coating based on a dielectric material with a high refractive index n, namely greater than 1.8, preferably greater than 1.95, and in a particularly preferred manner greater than 2, for example a monolayer of $TiO_2$ or of $Si_3N_4$, or of TiN, or of $SnO_2$ etc.

In another advantageous embodiment, the reflecting layer is formed of a stack of thin (sub)layers based on dielectric material(s) with alternately high refractive indices (preferably greater than 1.8, or even 1.95, or even 2 as previously explained) and low (preferably less than 1.65) refractive indices, in particular of a material or materials of the metal oxide (or metal oxynitride or nitride) type, such as $TiO_2$, $SiO_2$ or a mixed oxide (tin-zinc, zinc-titanium, silicon-titanium etc.) or an alloy etc., the (sub)layer deposited as the case may be first of all and being therefore located against the inner face of the plate, being a layer with a high refractive index.

As a (sub)layer material with a high refractive index, mention may be made for example of $TiO_2$ or possibly $SnO_2$, $Si_3N_4$, $Sn_xZn_yO_z$, $TiZnO_x$ or $Si_xTi_yO_z$, $ZnO$, $ZrO_2$, $Nb_2O_5$ etc. As a (sub)layer material with a low refractive index, mention may be made for example of $SiO_2$ or possibly a silicon oxycarbide and/or oxynitride, or a mixed oxide of silicon and aluminum or a fluorine-containing compound, for example of the $MgF_2$ or $AlF_3$ type etc.

The stack advantageously comprises for example at least three (sub)layers, the desired reflection being produced by the combined action of the various layers of the stack, the layer nearest to the substrate being a layer with a high refractive index, the intermediate layer being a layer with a low refractive index and the outer layer being a layer with a high refractive index (for example a stack comprising the alternately following oxide layers: (substrate)—$TiO_2$/$SiO_2$/$TiO_2$). The (geometric) thickness of each reflecting layer deposited is generally between 15 and 1000 nm, in particular between 20 and 1000 nm (the thickness of the substrate being generally a few millimeters, more often around 4 mm). In the case of a reflecting layer formed of several (sub)layers (generally in the form of a stack of layers) the thickness of each of the (sub) layers of the stack may vary between 5 and 160 nm, generally between 20 and 150 nm (for example in the case of the $TiO_2$/$SiO_2$/$TiO_2$ stack, it may be of the order of a few tens of nanometers, for example of the order of 60-80 nm, for each of the respective $TiO_2$ and $SiO_2$ layers, or may be of the order of 60-80 nm for $TiO_2$ layers and of the order of 130-150 nm for the $SiO_2$ layer according to the appearance that is desired for example to be more silvery or more golden).

The reflecting layer may be applied to the plate, generally after ceramization, in line or in another operation (for example after cutting and/or forming said plate). It may be applied in particular by pyrolysis (powder, liquid, gaseous), by evaporation or by spraying. Preferably, it is deposited by sputtering and/or by a vacuum deposition method and/or a plasma-assisted method. In particular, the method of depositing a layer or layers by cathode sputtering (for example by magnetron sputtering), in particular assisted by a magnetic field (and with a direct or alternating current) is used, the oxides or nitrides being deposited from a suitable metal or alloy or silicon or ceramic etc. target or targets, if necessary under oxidizing or nitriding conditions (argon/oxygen or argon/nitrogen mixtures as the case may be). Oxide layers may for example be deposited by reactive spraying of the metal in question in the presence of oxygen, and nitride layers in the presence of nitrogen. In order to make $SiO_2$ or $Si_3N_4$ it is possible to start from a silicon target that is lightly doped with a metal such as aluminum so as to make it sufficiently conducting. The (sub)layer or layers chosen according to the invention condense on the substrate in a particularly homogeneous manner without producing separation or delamination.

In another embodiment of the invention, the reflecting layer may be a layer containing effect pigments (pigments with a metallic effect, nacreous pigments, interference pigments, etc.) as the case may be dissolved in a suitable medium, this layer generally having a spangled effect. This layer is preferentially based on a molten silicate, frit or glass flux (vitrifiable mixture generally comprising oxides chosen in particular from those employed in frits for enamel, for example from the oxides of silicon, zinc, sodium, boron, lithium, potassium, calcium, aluminum, magnesium, barium, strontium, antimony, titanium, zirconium, etc.) and the effect pigments used are advantageously formed of aluminum oxide flakes ($Al_2O_3$) coated with metal oxides. Mention may be made for example of pigments marketed by Merck under the trade name "Xirallic®" such as $TiO_2$/$Al_2O_3$ pigments or interference pigments (Xirallic® T-50-10SW Crystal Silver or Xirallic® T-60-20SW Sunbeam Gold or Xirallic® T-60-21 SW Solaris Red or Xirallic® T-60-23SW Galaxy Blue or Xirallic® T-60-24SW Stellar Green), or $Fe_2O_3$/$Al_2O_3$ pigments (Xirallic® T-60-50SW Fireside Copper or Xirallic® F60-51 Radiant Red).

Other effect pigments that can be used are for example pearl (nacreous) pigments based on mica particles coated with oxides or a combination of oxides (chosen for example from $TiO_2$, $Fe_2O_3$, $Cr_2O_3$, etc.) such as those marketed under the trade name Iriodin® by Merck. Conventional coloring fillers or other pigments may also be incorporated in the aforementioned effect pigments. The rate of effect pigments may for example be of the order of 1 to 30% by weight relative to the base (molten silicate, frit or glass flux) in which they are incorporated. The layer may in particular be deposited by screen-printing (the base and pigments being as the case may be suspended in a suitable medium generally intended to be consumed in a subsequent firing step, it being possible in particular for this medium to include solvents, diluents, oils, resins, etc.), the thickness of the layer being of the order of 1 to 6 μm, for example.

Preferably, as has already been mentioned, the plate according to the invention is based on a transparent or translucent glass-ceramic and has a coating on the lower face comprising a background zone formed from a paint having a matt effect as previously defined, and a display zone formed from a reflecting layer having a mirror effect as previously defined or optionally formed from a paint as previously defined that is thinner than the background zone.

The plates according to the invention are generally plates with two smooth faces without spikes on the lower face.

The plate according to the invention may, as the case may be, be provided with (or associated with) a functional element or functional elements or additional decoration(s) (frame, connector(s), cable(s), control element(s), display(s), for example with light-emitting diodes known as "7-segment diodes", electronic control strip with touch-sensitive keys and digital display etc.) and/or may optionally include, apart from the aforementioned contrasted zones, one or more supplementary, in particular decorative, zones (for example an enamel on the upper face), but preferentially with limited dimensions.

The coating is generally continuous in each of the zones that can be discerned on the plate but it is not however excluded to have less covering deposits in some places (of the type for example with a spotted part or with a mesh or with speckles, etc.), the degree of coverage in these places remaining however preferentially large (close to 100%).

Preferably, the plate according to the invention is intended to be associated with subjacent induction heating elements. Induction heating hobs are known and are generally composed of a converter (or generator) connected to a self-induction coil (or inductor) consisting of a winding of conducting wires. The electromagnetic field created by the passage of a high frequency current produced by the converter generates Foucault currents in the metal base of utensils placed on the plate, enabling these utensils to be heated rapidly. Variations in temperature and the temperature maxima to which the plate is subjected are less than those observed with other heating elements, for example halogen or radiant heating elements, and on account of this the plate according to the invention is particularly well suited to this heating method, thermal shocks to which the coating is subjected being less severe and less likely to damage it in the long term.

The plates according to the invention satisfy the requirements in terms of optical properties and safety and have good thermal shock resistance etc. The plate according to the invention may advantageously be mounted on the insulating support, inside which the heating element or elements, such as inductors, are positioned, without an intermediate complex aimed at masking the inside of the apparatus from the view of the user.

The invention also relates to apparatuses (or devices) for cooking and/or for maintaining a high temperature, comprising at least one plate according to the invention (for example cookers and built-in cooking plates). The invention encompasses cooking apparatuses having a single plate as well as apparatuses having several plates, each of these plates being with a single or multiple heater(s). The term "heater" is understood to mean a cooking location. The invention also relates to mixed cooked apparatuses of which the cooking plate or plates comprise(s) several types of heaters.

Moreover, the invention is not limited to the production of cooking plates for cookers or cooking surfaces, even though the problem on which the invention is based is defined in relation to this application. Plates produced according to the invention may also be other plates that have to exhibit great insensitivity to temperature variations.

The object of the invention is also a method for producing a plate according to the invention.

The production of glass-ceramic plates generally proceeds as follows: in a melting furnace, the glass of the composition chosen to form this glass-ceramic is melted and then the molten glass is laminated into a standard ribbon or sheet by passing the molten glass between laminating rollers, and the glass strip is cut up into the desired dimensions. The plates cut up in this way are then ceramized in a known manner, ceramization consisting of firing the plates following the heating profile chosen to convert the glass into the polycrystalline material called "glass-ceramic" of which the coefficient of expansion is zero or nearly zero and which withstands a thermal shock that can extend up to 700° C. Ceramization generally comprises a step in which the temperature is raised progressively to the nucleation region, generally situated close to the transformation region of the glass, a step passing through the nucleation interval in several minutes, a new progressive increase in temperature up to the temperature of the ceramization stage (or plateau), maintenance of the temperature of the ceramization stage over several minutes and then rapid cooling to ambient temperature.

The method generally includes a cutting operation, for example by water jet, possibly followed by a shaping operation (grinding, beveling, etc.).

The method for producing the plate according to the invention is characterized in that at least one first layer (or assembly of (sub)layers) intended to form at least one first zone is applied to one face of the bare glass-ceramic plate (preferably the face intended to be the lower face in the position of use) and in which one or more savings or reserves (uncoated areas) are provided or made, and said reserves are covered by at least one second layer (or assembly of (sub)layers) intended to form at least one second zone contrasted with respect to the first zone or zones.

The layers are applied by any means known to a person skilled in the art according in particular to the composition of said layers to be formed. Examples of different possible application methods have been previously given. According to the type of layer, deposition may be carried out before ceramization (the case for example of a layer of enamel that can be baked during ceramization) or after ceramization (the preferred case of paint and layers of the metallic type or those based on a dielectric material previously described) in line or in a separate operation (for example after cutting and/or forming said plate).

For the formation of reserves, different means may be used (according to the type of layer deposited and the precision of the deposition means). The reserves may be left by the deposition technique (screen-printing) or by providing suitable masks, for example made of sheet metal etc. It is also possible to consider depositing a layer that can be eliminated, in the region of the reserves, by washing, ablation, polishing etc., for example deposition of a paint that is only hardened or crosslinked in the desired parts, the remainder being eliminated by washing, or deposition of a layer or layers of the metallic type or those based on a dielectric material in which the reserves are removed by means such as laser ablation or polishing.

Concerning deposition of the second layer, it can be carried out only in the reserves (with suitable deposition means or masks for example), or on a larger part of the plate, in particular over all the plate.

Thus, according to a preferred embodiment of the method according to the invention, there is applied, for example by screen-printing (in one or several passes or sub-layers, and while providing reserves) a first paint layer, in particular of (matt) paint as previously mentioned, and then, after heat treating or baking the paint and possible washing of the plate, the second layer (or assembly of (sub)layers) is applied while covering all the zones already covered and the reserves by at least one reflecting layer with a mirror effect, by cathode sputtering (in the case of magnetron sputtering, it is in point of fact easier to deposit the whole plate).

In another embodiment, the deposition order may be reversed, for example by depositing at least one continuous reflecting layer on the lower face of the plate provided with masks in the locations of the chosen reserves, by removing the masks and if necessary covering again the parts already covered by other masks, and then by applying the paint, the paint advantageously only covering, on the final plate obtained, zones not covered by the reflecting layer.

The subject of the present invention is also an apparatus or device for producing a glass-ceramic plate such as defined above, comprising at least one device for coating by screen-printing and at least one cathode sputtering device.

Example

The following example illustrates the present invention without however limiting its scope, together with the appended FIGURE showing a view (partial view derived from a photograph) from above in perspective of a plate according to the invention produced in accordance with this example.

A transparent glass-ceramic plate 1 is produced, of which the two faces are smooth, from a glass having for example the composition described in application EP0437228.

This glass is melted at around 1600° C. in a quantity such that a glass strip can be laminated, strip from which glass plates are cut having the final dimensions 56.5 cm×56.5×0.4 cm.

These glass plates are ceramized on ceramic grids following a ceramization cycle comprising the following steps:
a) raising the temperature at 30-80 degrees/minute up to the nucleation region, generally situated close to the glass transformation region;
b) crossing the nucleation interval (670-800° C.) in around 20 minutes with the temperature being held for a few minutes;
c) raising the temperature in 15 to 30 minutes to the temperature T of the ceramization plateau of the order of 930° C.;
d) holding the temperature T of the ceramization plateau for a time t of the order of 20 minutes;
e) rapidly cooling to ambient temperature.

The plate obtained is coated (for example by screen-printing, with dilution, where appropriate, of the composition applied in a suitable medium) with a paint based on at least one polysiloxane resin (obtained for example by mixing a silicone polymer and a silicone solution) and fillers (such as a mixture of dark colored pigments, for example so as to give a gray color) over the whole lower face, with the exception:
of locations or reserves consisting of four circular crowns 2a delimiting the locations which will be situated above the four induction heating hobs in the position in which the plates are used,
regions 2b forming symbols (+, − and the operating symbol) as well as seven rectangles delimiting zones which will be situated above the displays or indicators (of duration, power etc.),
and essentially decorative signs 2c (here the first 6 letters of the word "INDUCTION" and a rectangle making the last three letters ION stand out in negative).

The paint is then baked or cured in an oven or tunnel. The thickness of the layer obtained is for example between 15 and 100 microns. It is then possible to see by transparency through the plate, a background zone, for example of a matt gray color, formed of several small zones 3a, 3b, 3c, 3d delimited by the reserves.

Following any possible washing of the plate coated with paint, a reflecting layer is deposited, for example one based on Ni—Cr—Fe (in respective proportions for example of the order of 68%/22%/10%) in thicknesses of the order of 22.5 nanometers (enabling a good compromise to be obtained for this layer for display zones between hiding the extinguished displays and of seeing them distinctly when they are illuminated) by magnetron sputtering, over the whole surface area of the lower face of the plate already coated with paint. The mirror effect produced by this very fine reflecting layer is only exerted at the location of the reserves provided in the paint layer and does not have a negative effect on the opaque matt gray appearance of the background zone of the glass-ceramic, visible by transparency from above the plate.

A glass-ceramic plate is thus obtained with a pleasing and original esthetic appearance, this plate having for example a matt and opaque gray/metallized gray background zone (formed by all the zones 3a, 3b, 3c, 3d) hiding the elements of the subjacent structure of the cooking device, and including a display zone (formed by all the zones 2a, 2b, 2c) with designs having a shiny appearance (for example with a rather silvery mirror appearance) also hiding the subjacent elements at rest while enabling them to be seen when they are in the operating state. Since the coating is totally on the lower face, there are no problems with a double image or problems of the abrasion of the decoration (for example with rubbing by a saucepan). The plate can be mounted in a frame 4, set into a cooking device, etc.

Plates according to the invention can in particular be advantageously used for producing a novel range of cooking plates for cookers or cooking surfaces.

The invention claimed is:
1. A glass-ceramic plate for covering or receiving at least one heating element of a cooking plate, comprising:
a glass-ceramic substrate; and
a coating formed on a surface of the glass-ceramic substrate;
wherein:
the coating comprises a matte coating and a reflective coating;
the matte coating and the reflective coating together cover an entirety of the surface of the glass-ceramic substrate;
the coating comprises a background zone and a display zone;
the background zone corresponds to an area of the surface of the glass-ceramic substrate where the matte coating is present and occupies from 50 to 99% of a surface area of the coating;
the background zone comprises a layer of the matte coating formed on the surface of the glass-ceramic substrate or a layer of the matte coating formed on the surface of the glass-ceramic substrate with a layer of the reflective coating formed thereover;

the display zone corresponds to an area of the surface of the glass-ceramic substrate where the matte coating is not present and occupies from 1 to 50% of the surface area of the coating;

the display zone comprises a layer of the reflective coating formed on the surface of the glass-ceramic substrate;

the background zone has a matte appearance when viewing the glass-ceramic plate, such that a main part of a heating structure of the cooking plate is masked when the glass-ceramic plate is used in the cooking plate; and the display zone has a reflective appearance relative to the background zone when viewing the glass-ceramic plate, such that decoration, information, or functional elements are revealed and operation of such elements may be detected when the glass-ceramic plate is used in the cooking plate.

2. The glass-ceramic plate as claimed in claim 1, wherein the glass-ceramic substrate is transparent or translucent.

3. The glass-ceramic plate as claimed in claim 1, wherein the surface of the glass-ceramic substrate faces the at least one heating element of the cooking plate when the glass-ceramic plate is used in the cooking plate.

4. The glass-ceramic plate as claimed in claim 1, wherein the background zone of the coating has a different thickness from the display zone of the coating.

5. The glass-ceramic plate as claimed in claim 1, wherein the display zone of the coating is thinner than the background zone of the coating.

6. The glass-ceramic plate as claimed in claim 5, wherein:
the matte coating and the reflective coating comprise paints having degradation temperatures greater than 350° C.;
each of the paints forming the matte coating and the reflective coating comprises at least one of a silicone resin and a high temperature resistant (co)polymer;
the high temperature resistant (co)polymer comprises at least one member selected from the group consisting of polyimides, polyamides, polyfluorinated resins, polysiloxane resins; and
each of the paints optionally comprises at least one mineral filler.

7. The glass-ceramic plate as claimed in claim 5, wherein:
the reflective coating has a mirror or shiny effect; and
the reflective coating comprises at least one (sub)layer comprising at least one of a metallic (sub)layer, a dielectric material (sub)layer, a (sub)layer formed from a molten silicate including effect pigments, a (sub)layer formed from a frit including effect pigments, and a (sub)layer formed from a glass flux including effect pigments.

8. A cooking plate, comprising:
the glass-ceramic plate as claimed in claim 1; and
induction heating elements provided subjacent to the glass-ceramic plate.

9. A method for producing a plate as claimed in claim 1, comprising:
applying the matte coating to at least one first zone of the bare glass-ceramic substrate without applying the matte coating to at least one second zone; and
applying the reflective coating to the at least one second zone of the glass-ceramic substrate.

10. The method as claimed in claim 9, wherein applying the reflective coating comprises applying the reflective coating to the at least one first zone and the at least one second zone of the glass-ceramic substrate after the matte coating is applied to the at least one first zone.

11. The method as claimed in claim 9, wherein applying the reflective coating comprises applying the reflective coating to the at least one second zone of the glass-ceramic substrate without applying the matte coating to at least one first zone before the matte coating is applied to the at least one first zone.

12. A device for cooking and/or for maintaining a high temperature, comprising:
the glass-ceramic plate as claimed in claim 1; and
one or more heating elements.

13. A device for producing the glass-ceramic plate as claimed in claim 1, comprising at least one device for coating by screen-printing and at least one cathode sputtering device.

14. The glass-ceramic plate as claimed in claim 1, wherein the background zone consists of the layer of the matte coating formed on the surface of the glass-ceramic substrate.

15. The glass-ceramic plate as claimed in claim 1, wherein the background zone comprises the layer of the matte coating formed on the surface of the glass-ceramic substrate with the layer of the reflective coating formed thereover.

* * * * *